(12) United States Patent
Nishita

(10) Patent No.: US 10,636,171 B2
(45) Date of Patent: Apr. 28, 2020

(54) DEVICE, METHOD, AND SYSTEM FOR TRACKING UNMANNED AERIAL VEHICLE, AND PROGRAM THEREFOR

(71) Applicant: TOPCON CORPORATION, Itabashi-ku, Tokyo (JP)

(72) Inventor: Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 161 days.

(21) Appl. No.: 15/891,608

(22) Filed: Feb. 8, 2018

(65) Prior Publication Data

US 2018/0240253 A1 Aug. 23, 2018

(30) Foreign Application Priority Data

Feb. 20, 2017 (JP) ................. 2017-029066

(51) Int. Cl.

| | | |
|---|---|---|
| *G06T 7/77* | (2017.01) | |
| *G05D 1/00* | (2006.01) | |
| *B64C 39/02* | (2006.01) | |
| *G01C 3/08* | (2006.01) | |
| *G01C 11/04* | (2006.01) | |
| *G01S 17/66* | (2006.01) | |
| *G01S 19/14* | (2010.01) | |
| *G01S 19/51* | (2010.01) | |

(52) U.S. Cl.
CPC ............. *G06T 7/77* (2017.01); *B64C 39/024* (2013.01); *G01C 3/08* (2013.01); *G01C 11/04* (2013.01); *G01S 17/66* (2013.01); *G05D 1/0033* (2013.01); *B64C 2201/127* (2013.01); *B64C 2201/145* (2013.01); *G01S 19/14* (2013.01); *G01S 19/51* (2013.01); *G06T 2207/30241* (2013.01)

(58) Field of Classification Search
CPC ... G06T 7/70; G06T 7/77; G06T 2207/30241; G06K 2209/21; G01C 15/00; G05D 1/0033; G01S 19/51; B64C 39/024; B64C 2201/123; B64C 2201/127
See application file for complete search history.

(56) References Cited

U.S. PATENT DOCUMENTS

| | | | |
|---|---|---|---|
| 2009/0235541 A1 | 9/2009 | Kumagai et al. | ............... 33/281 |
| 2012/0242830 A1 | 9/2012 | Kumagai et al. | ............ 348/135 |
| 2014/0163775 A1* | 6/2014 | Metzler | ............... G01C 15/002 701/2 |
| 2014/0210663 A1 | 7/2014 | Metzler | .................. G01C 15/00 |
| 2018/0019801 A1* | 1/2018 | Dowlatkhah et al. | ....................... H04B 7/18506 |
| 2018/0107229 A1* | 4/2018 | Tian et al. | ........... G05D 1/0094 |

FOREIGN PATENT DOCUMENTS

| | | | |
|---|---|---|---|
| JP | 2009-229192 A | 10/2009 | ............. G01C 15/00 |
| JP | 2012-202821 A | 10/2012 | ............. G01C 15/00 |

* cited by examiner

*Primary Examiner* — Andrew W Johns
(74) *Attorney, Agent, or Firm* — Chiesa Shahinian & Giantomasi PC

(57) ABSTRACT

A technique for reliably locking on a UAV in tracking the UAV by an optical device is provided. The location of a total station (TS) is measured, and location information of a UAV during hovering is obtained from a GPS unit that is mounted on the UAV. On the basis of the location of the TS and the location information of the UAV during hovering, the TS calculates the direction of the UAV as seen from the TS to capture the UAV.

1 Claim, 5 Drawing Sheets

Figure 1:
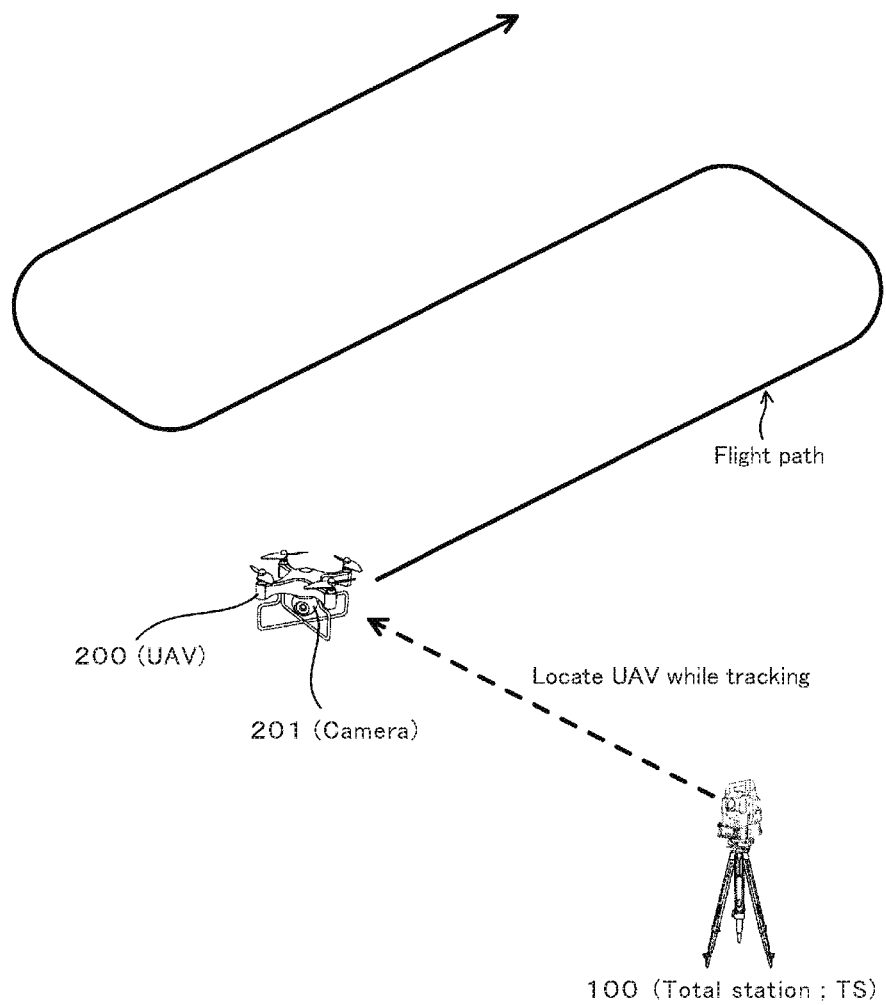

DEVICE, METHOD, AND SYSTEM FOR TRACKING UNMANNED AERIAL VEHICLE, AND PROGRAM THEREFOR

CROSS-REFERENCE TO RELATED APPLICATION

This application is based upon and claims benefit of priority from Japanese Patent Application No. 2017-029066, filed Feb. 20, 2017, the entire contents of which are incorporated herein by reference

TECHNICAL FIELD

The present invention relates to a technique for optically tracking an unmanned aerial vehicle during flight.

BACKGROUND

Technologies using an unmanned aerial vehicle (UAV) in surveying are publicly known. The UAV used in these technologies may be mounted with a location measuring device using a global navigation satellite system (GNSS) (called a "GPS receiver"), an inertial measurement unit (IMU), an altimeter, and a camera. Such a UAV may be made to photograph the ground while flying along a predetermined path in aerial photogrammetry or in other surveying.

The UAV can locate its own location using the GNSS, but this locating is independent positioning having a positioning accuracy of approximately 1 meter in a horizontal direction and approximately 3 meters in a vertical direction, which does not achieve the accuracy required in photogrammetry. A UAV may be mounted with a more highly accurate location measuring device that can perform relative positioning using a GNSS. However, this idea is difficult to apply to a general purpose UAV in consideration of weight and electric power consumption of the device. To solve these problems, a total station (TS) may be used to track a UAV in flight and locate the UAV by using its laser distance measuring function (for example, refer to US2014/0210663).

This method of tracking the UAV by the TS uses an automatic target-tracking function of the TS. In this technique, searching laser light is used to capture and track the UAV. The UAV has a reflective prism that reflects the searching laser light back in the incident direction, and the TS detects light reflected from the reflective prism to track the UAV.

The tracking of the UAV by the TS is normally performed as follows. First, a UAV placed on the ground before its flight is captured and is locked on by a TS. Then, the flight of the UAV is started, and the flying UAV is tracked by the TS. In this method, an obstacle between the UAV placed on the ground and the TS may prevent the initial lock-on in the initial stage. Moreover, reflected light may not be sufficiently obtained from a prism of the UAV on the ground because the prism serving as a target is normally attached to the bottom of the UAV.

To solve these problems, the UAV may be made to hover immediately after starting its flight to help the TS easily capture the UAV. This method requires some extra time for hovering to allow the TS to reliably capture the UAV. However, the hovering during the set extra time consumes battery power of the UAV.

Moreover, this method may fail to allow the TS to lock on the UAV when the UAV is displaced from a specified hovering position because of being displaced by wind or because of other reasons.

EMBODIMENTS

In view of these circumstances, an object of the present invention is to provide a technique for reliably locking on a UAV in tracking the UAV by an optical device.

A first aspect of the present invention provides an unmanned aerial vehicle tracking device including a reference location obtaining part, an unmanned aerial vehicle location obtaining part, and an unmanned aerial vehicle direction calculating part. The reference location obtaining part obtains information of a reference location. The unmanned aerial vehicle location obtaining part obtains information of a location of an unmanned aerial vehicle that is flying. The unmanned aerial vehicle direction calculating part calculates a direction of the unmanned aerial vehicle as seen from the reference location by referring to the obtained information of the reference location and the obtained information of the location of the unmanned aerial vehicle.

According to a second aspect of the present invention, in the first aspect of the present invention, the information of the location of the unmanned aerial vehicle may be information of a location of a specific airspace in which the unmanned aerial vehicle remains. According to a third aspect of the present invention, in the invention according to the second aspect of the present invention, the direction of the unmanned aerial vehicle as seen from the reference location may be calculated upon receiving a signal notifying that the unmanned aerial vehicle has begun to remain in the specific airspace during flying. According to a fourth aspect of the present invention, in the third aspect of the present invention, the unmanned aerial vehicle may remain in the specific airspace by hovering during flight. According to a fifth aspect of the present invention, in any one of the first to the fourth aspects of the present invention, the unmanned aerial vehicle tracking device may further include a transmitting part that transmits a signal to the unmanned aerial vehicle to notify of the capture of the unmanned aerial vehicle.

A sixth aspect of the present invention provides an unmanned aerial vehicle tracking method including obtaining information of a reference location, obtaining information of a location of an unmanned aerial vehicle that is flying, and calculating a direction of the unmanned aerial vehicle as seen from the reference location by referring to the obtained information of the reference location and the obtained information of the location of the unmanned aerial vehicle.

A seventh aspect of the present invention provides an unmanned aerial vehicle tracking system including a reference location obtaining part, an unmanned aerial vehicle location obtaining part, and an unmanned aerial vehicle direction calculating part. The reference location obtaining part obtains information of a reference location. The unmanned aerial vehicle location obtaining part obtains information of a location of an unmanned aerial vehicle that is flying. The unmanned aerial vehicle direction calculating part calculates a direction of the unmanned aerial vehicle as seen from the reference location by referring to the obtained information of the reference location and the obtained information of the location of the unmanned aerial vehicle.

An eighth aspect of the present invention provides a non-transitory computer recording medium storing computer executable instructions that, when executed by a computer processor in tracking an unmanned aerial vehicle, cause the computer processor to: obtain information of a reference location, obtain information of a location of an unmanned aerial vehicle that is flying, and calculate a direction of the unmanned aerial vehicle as seen from the reference location by referring to the obtained information of the reference location and the obtained information of the location of the unmanned aerial vehicle.

The present invention provides a technique for reliably locking on a UAV in tracking the UAV by an optical device.

DETAILED DESCRIPTION

Figure 2:
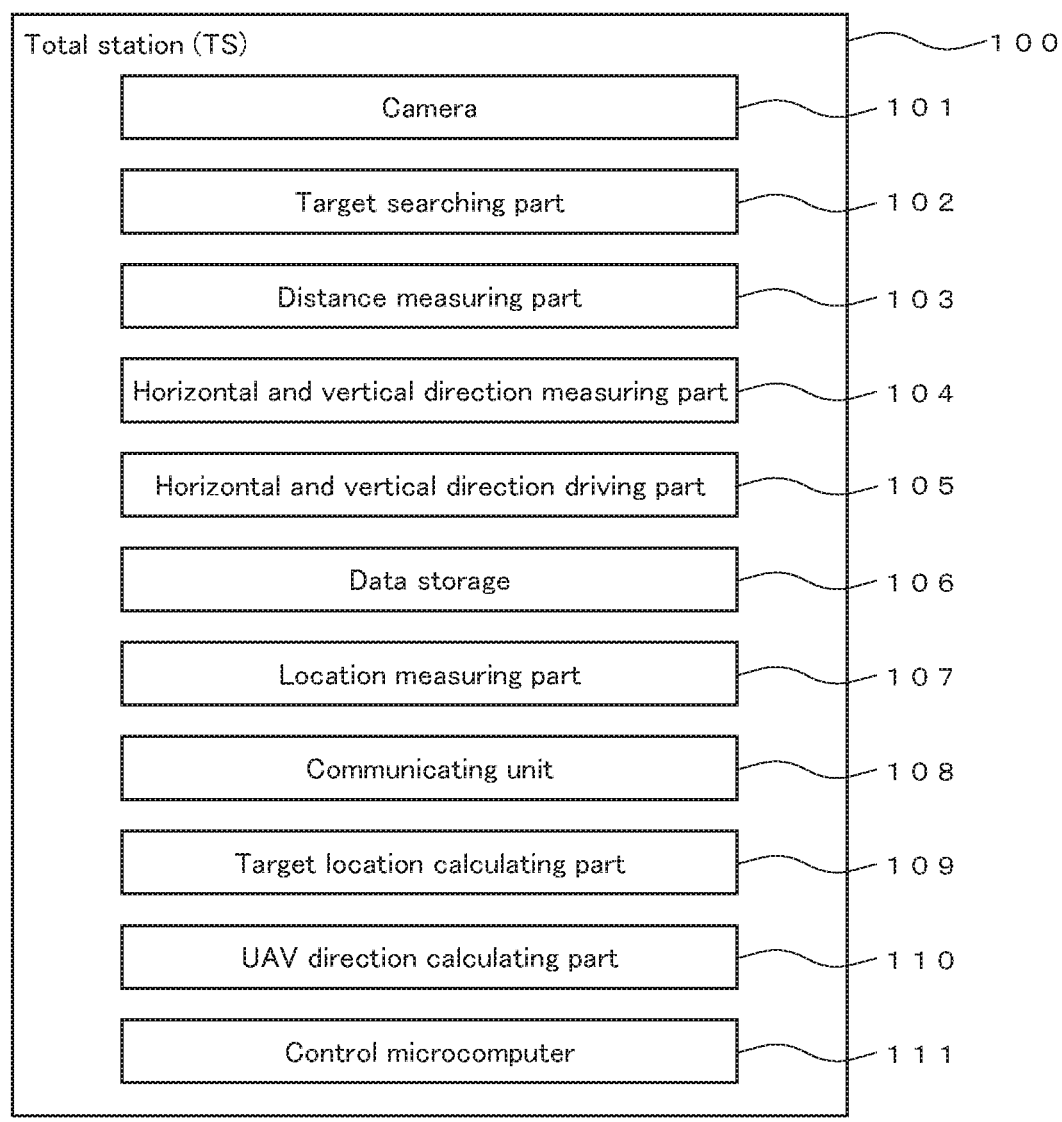
Figure 3:
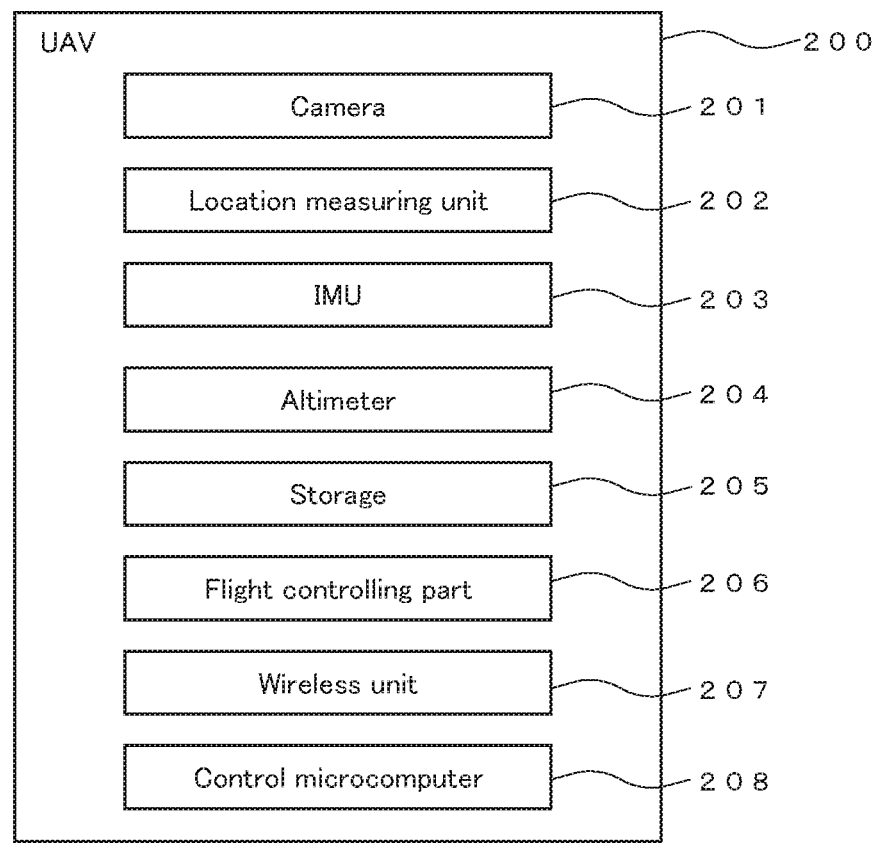
Figure 4:
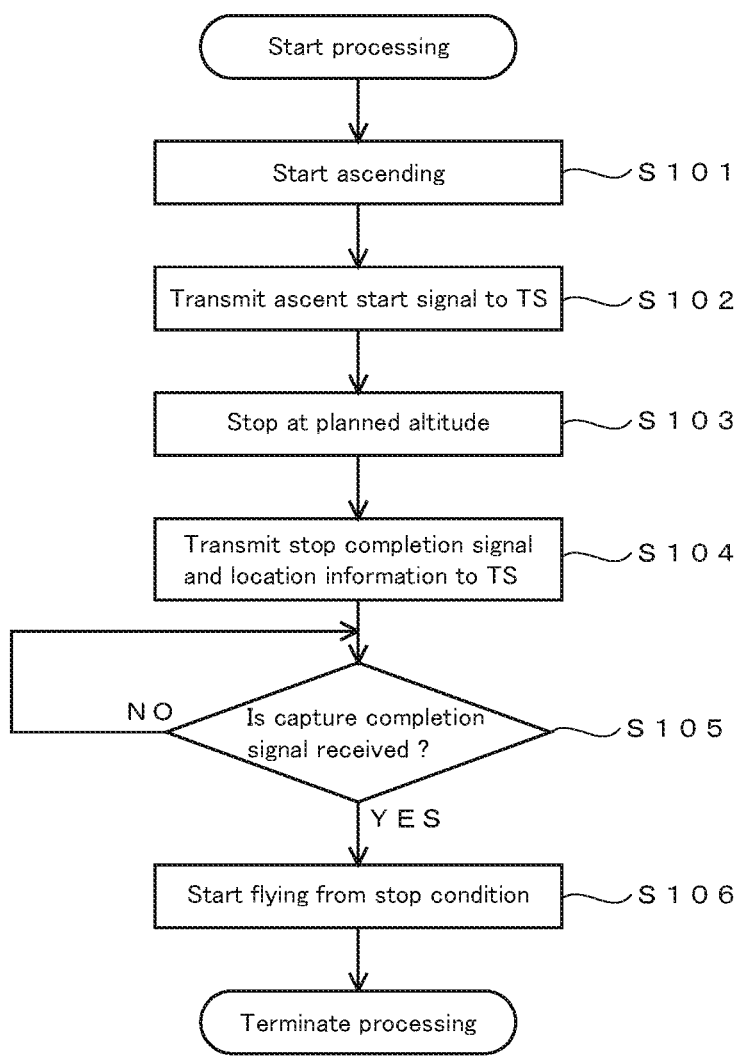
Figure 5:
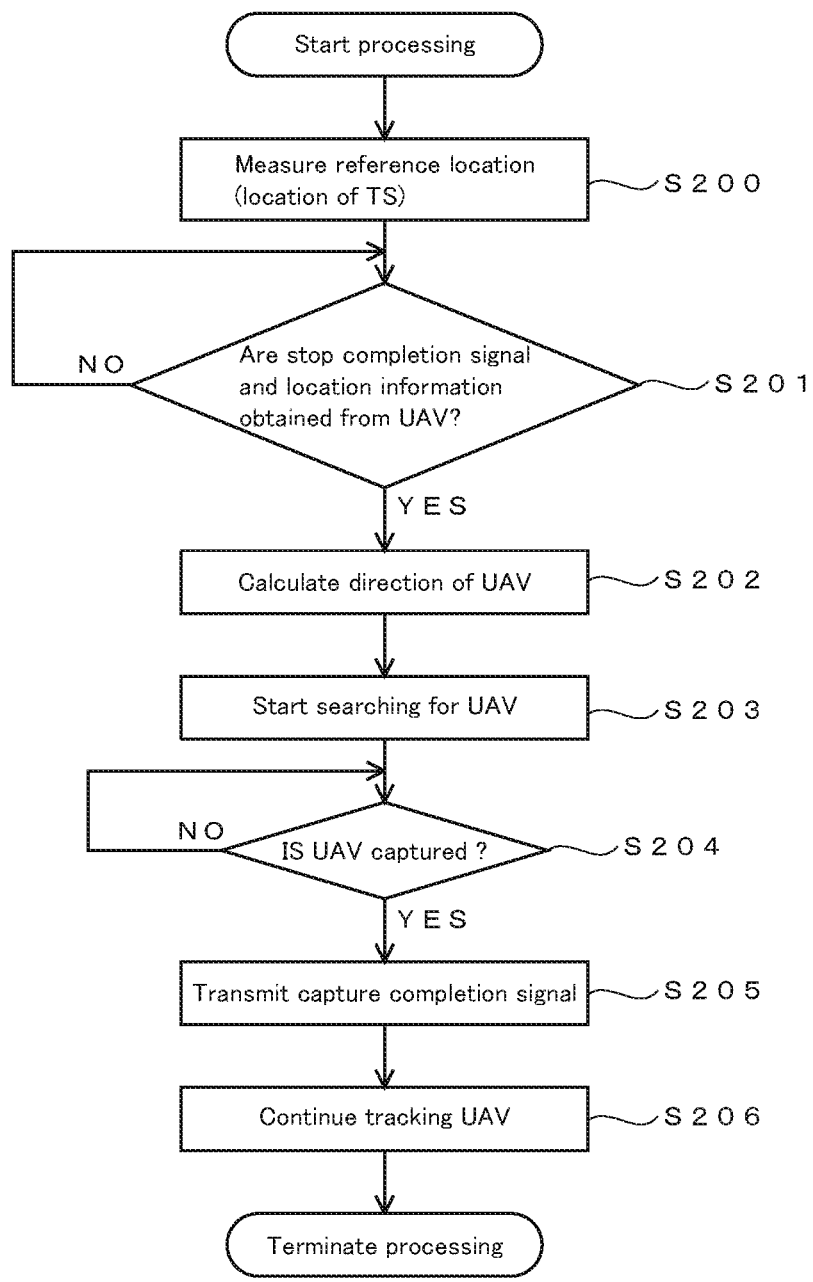

FIG. 1 is a conceptual diagram of an embodiment.
FIG. 2 is a block diagram of an example of a TS.
FIG. 3 is a block diagram of an example of a UAV.
FIG. 4 is a flow chart showing an example of processing performed by the UAV.
FIG. 5 is a flow chart showing an example of processing performed by the TS.

PREFERRED EMBODIMENTS OF THE INVENTION

Outline

In this embodiment, a total station (TS) 100 is located, and location information of a UAV 200 remaining in a specific airspace by hovering is obtained from a location measuring unit mounted on the UAV 200. On the basis of the location information of the TS 100 and the location information of the UAV 200 during hovering, the TS 100 calculates the direction of the UAV 200 as seen from the TS 100 to capture the UAV 200. A TS serving as an optical device that tracks a UAV is described herein, but an optical device that tracks a UAV by referring to photographic images taken by a camera may also be used.

FIG. 1 shows the UAV 200 in flight and the TS 100 located on the ground. In this embodiment, the TS 100 tracks the UAV 200 that is flying.

Total Station (TS)

The TS 100 has a location measuring device using a GNSS, a camera for obtaining images, a laser scanning function for searching for a target, a laser distance measuring function for measuring a distance to the target by using distance-measuring laser light, a measuring function for measuring the direction of the target of which the distance is measured by using the laser light, and a communication function to communicates with the UAV. The target is a reflective prism on the UAV. The direction of the target is measured by a horizontal angle and a vertical angle, which is an elevation angle or a depression angle.

Measuring the distance and the direction of the target provides the location of the target relative to the TS 100. When the location of the TS 100 is known, the location of the target (here, the UAV) in a map coordinate system (latitude, longitude, and altitude) or in an orthogonal coordinate system (XYZ coordinates) is determined. These functions are normally provided to a commercially available TS and are not special. These techniques relating to the TS may be found in Japanese Unexamined Patent Applications Laid-Open Nos. 2009-229192 and 2012-202821, for example. The map coordinate system describes map information (for example, latitude, longitude, and altitude or elevation). For example, location information obtained from the GNSS is normally described in the map coordinate system.

Hereinafter, an example of the TS 100 used in this embodiment will be described. FIG. 2 shows a block diagram of the TS 100. The TS 100 includes a camera 101, a target searching part 102, a distance measuring part 103, a horizontal and vertical direction measuring part 104, a horizontal and vertical direction driving part 105, a data storage 106, a location measuring part 107, a communicating unit 108, a target location calculating part 109, a UAV direction calculating part 110, and a control microcomputer 111.

The camera 101 is configured by using a camera module such as a CCD image sensor or a CMOS image sensor. The communicating unit 108 uses a wireless module constructed of dedicated hardware. The other functional components shown in FIG. 2 may be constructed of dedicated hardware or may be constructed of software by using a microcomputer. Examples of hardware that implements the components shown in FIG. 2 may include various types of electronic devices such as a camera module for the camera and a wireless module for the communicating unit 108, various kinds of driving mechanisms using motors or other units, a sensor mechanism, optical parts, various types of electronic circuits, a central processing unit (CPU), an application specific integrated circuit (ASIC), and a field programmable gate array (FPGA). The hardware configuration described above also applies to the UAV 200.

The camera 101 photographs moving images or still images of an object to be surveyed, such as the UAV 200 or a target. The data of the images photographed by the camera 101 is stored in an appropriate storage area in association with measurement times, measurement directions, measurement distances, locations, and other parameters, of the object, for which distance is to be measured.

The target searching part 102 searches for the target (UAV) by using searching laser light that is composed of triangular pyramid-shaped or fan-shaped beams. The target is searched for by setting a reference location at the TS 100. The distance measuring part 103 measures a distance to the target by using distance-measuring laser light. The horizontal and vertical direction measuring part 104 measures a horizontal angle and a vertical angle (elevation angle or depression angle) of the target of which the distance is measured by the distance measuring part 103. An optical system for the target searching part 102 and the distance measuring part 103 is provided to a casing part of which horizontal rotation and elevation or depression angle are controllable. The horizontal angle and the vertical angle are measured by an encoder. The output of the encoder is received by the horizontal and vertical direction measuring part 104, and the horizontal angle and the vertical angle (elevation angle or depression angle) are measured.

The horizontal and vertical direction driving part 105 includes a motor, a driving circuit for the motor, and a controlling circuit for the driving circuit. The motor controls the horizontal rotation, the elevation angle, and the depression angle of the casing part, which has the optical system for the target searching part 102 and the distance measuring part 103. The data storage 106 stores control programs necessary for operating the TS 100, various kinds of data, survey results, and other information.

The location measuring part 107 locates the TS 100 by using the GNSS. The location measuring part 107 can perform both of relative positioning and independent positioning. Under circumstances that allow the relative positioning, the location of the TS 100 is preferably measured by the relative positioning. However, in a case in which the relative positioning is difficult to perform, the location of the TS 100 is measured by independent positioning.

The communicating unit 108 communicates with the UAV 200 and an external device. The TS 100 can be controlled by an external terminal (a dedicated terminal, a PC, a tablet, a smartphone, or other device) and can communicate with the external terminal by using the communicating unit 108. The communicating unit 108 receives various data necessary for operating the TS 100 and outputs various data obtained from the TS 100 to the outside. In particular, the communicating unit 108 receives and obtains information of the location of the UAV 200 from the UAV 200. The communicating unit 108 communicates with the UAV 200 via wireless communication and communicates with the outside terminal via wireless communication, optical communication, or wired communication.

The target location calculating part 109 calculates the location (coordinates) of the target (here, the reflective prism mounted on the UAV 200) relative to the TS 100, from the distance and the direction to the target. The distance to the target is obtained by the distance measuring part 103, and the direction of the target is obtained by the horizontal and vertical direction measuring part 104. Since the location of the TS 100 serving as a reference location is identified by the location measuring part 107, the location of the target in the map coordinate system is determined by calculating the location of the target relative to the TS 100.

The UAV direction calculating part 110 calculates the direction of the UAV 200 as seen from the TS 100 while the UAV 200 hovers after the UAV 200 starts flight and immediately ascends. Hereinafter, this processing is described. In this processing, location information of the UAV 200, which is measured by a location measuring unit 202, is obtained from the UAV 200. Moreover, the location of the TS 100 measured by the location measuring part 107 is obtained as a reference location. The TS 100 is preferably located by relative positioning, but independent positioning can also be performed for locating the TS 100.

A three-dimensional orthogonal coordinate system having an origin at the TS 100 is set, and the location of the UAV 200 is plotted therein. As a result, the direction of the UAV 200 during hovering as seen from the TS 100 is determined. Specifically, an equation of a straight line connecting the TS 100 and the UAV 200 is set up, and an extending direction within a plane and an elevation angle of the straight line are determined, whereby the direction of the UAV 200 as seen from the TS 100 is calculated. The extending direction within the plane of the straight line is represented by, for example, an angle in a horizontal direction starting from the north in the clockwise direction.

The control microcomputer 111 comprehensively controls the execution of the processing in the flow chart shown in FIG. 5, which is described later.

UAV

FIG. 2 shows a block diagram of the UAV 200. The UAV 200 is a rotary wing vehicle configured to be able to vertically ascend, vertically descend, and hover to remain stationary in the air. The UAV 200 autonomously flies along a predetermined flight path and conducts photographing for aerial photogrammetry. Also, the flight of the UAV 200 can be wirelessly controlled. The UAV 200 is mounted with a camera 201, a location measuring unit using a GNSS (for example, a GPS receiver) 202, an inertial measurement unit (IMU) 203, an altimeter 204, a storage 205 for storing a predetermined flight plan and flight log, a flight controlling part 206 for controlling the flight by controlling the rotation of a rotor and other movement, a wireless unit 207 for communicating with the TS 100, and a control microcomputer 208 for comprehensively controlling the execution of the processing shown in FIG. 4, which is described later.

The UAV 200 flies along a predetermined flight plan by using its location measuring unit and its IMU. The flight plan specifies the time to start a flight, coordinates (latitude, longitude, and altitude) of multiple points Pn to be passed through, and speeds between adjacent points. The UAV 200 autonomously flies in accordance with this flight plan. The location of the UAV 200 at a specified time is calculated from the location of the point Pn and the flight time. The time to start a flight can be set at any time on site. The flight plan may also specify a relationship between the time and the location from when the flight is started.

In accordance with the flight plan in this embodiment, after starting flight, the UAV 200 first ascends, hovers, and remains at a predetermined altitude. The remaining state is released upon receiving a hovering release signal that is transmitted from the TS 100. This release of the remaining state triggers flight for photogrammetry using the camera 201. Thereafter, flight is performed in accordance with the flight plan. The progress of the flight is stored in a flight log file. The flight log file contains information of times and information of locations (latitude, longitude, and altitude) and attitudes of the UAV 200 in association with each other. The data of the images photographed by the camera 201 is stored in the storage 205 in association with photographing times, and locations (latitude, longitude, and altitude) and attitude (direction) of the UAV 200 at the photographing times.

The UAV 200 is attached with a dedicated reflective prism at a position that is easy to view from the outside (a position easy for the TS 100 to find, for example, a bottom of the UAV 200). The reflective prism receives and reflects both searching laser light and distance-measuring laser light from the TS 100. The reflective prism is a dedicated target for surveying to be conducted by the TS 100 and reflects incident laser light back in the incident direction.

Operation of UAV

FIG. 4 shows an example of a processing procedure performed by the UAV 200. Programs for executing the processing shown in FIG. 4 are stored in the storage 205 and are comprehensively executed by the control microcomputer 208.

Upon being instructed to start a flight, the UAV 200 first ascends to an altitude that is specified in the flight plan (step S101). Simultaneously, upon being instructed to start a flight, the UAV 200 starts to perform positioning by using the location measuring unit 202. The positioning is performed at each specific time, for example, at every 0.5 seconds.

After the UAV 200 has started to ascend, the wireless unit 207 transmits a signal to the TS 100 to notify the start of ascending (step S102). Upon receiving this signal, the TS 100 starts processing. After reaching the altitude specified in the flight plan, the UAV 200 shifts its state to a hovering state to maintain its location and its altitude (step S103). After starting to hover, the UAV 200 transmits a stop completion signal and data of the remaining location (hovering location) to the TS 100 (step S104).

While hovering, the UAV 200 waits for a capture completion signal from the TS 100 (step S105). The capture completion signal notifies that the TS 100 has completed capturing the UAV 200. Upon receiving the capture completion signal from the TS 100, the UAV 200 starts to fly for photogrammetry in accordance with the flight plan (step S106). In a case in which the UAV 200 does not receive the capture completion signal from the TS 100 even when a specified time has passed, the UAV 200 determines that an error has occurred. Thus, the UAV 200 does not start to fly but transmits an error signal to a controller (not shown) of a user. Then, the UAV 200 discontinues the flight, descends from the hovering condition, and lands.

Operation of TS

After the communicating unit 108 receives the signal notifying that the UAV 200 has begun to ascend, the processing at the TS 100 side starts. After the processing starts, the TS 100 measures its location as a reference location by using the location measuring part 107 (step S200) and waits for the stop completion signal and the signal of location information transmitted from the UAV 200 (step S201). When the communicating unit 108 receives the stop completion signal and the signal of the location information, the TS 100 calculates the direction of the UAV 200 as seen from the TS 100 by referring to its location information and the received location information of the UAV 200, by using the UAV direction calculating part 110 (step S202).

After calculating the direction of the UAV 200 that is hovering, the TS 100 searches for the UAV 200 around the calculated direction by using the target searching part 102 (step S203). The UAV 200 is located by independent positioning, and therefore, the location information of the UAV 200 that is hovering contains a measurement error even when the TS 100 is located by relative positioning. Considering this point, the search area is set.

As a result of the search in step S203, when the target searching part 102 succeeds in capturing the UAV 200, the communicating unit 108 transmits the capture completion signal to the UAV 200 (step S205). Thereafter, the TS 100 starts to track the UAV 200 that stops hovering and starts to fly in accordance with the flight plan upon receiving the capture completion signal (step S206). Meanwhile, the TS 100 continues to locate the UAV 200 as seen from the TS 100 while capturing the UAV 200.

In the above-described processing, the TS 100 reliably locks on the UAV 200 by referring to the location information of the hovering location that is transmitted from the UAV 200, and the UAV 200 stops hovering and starts to fly for aerial surveying at the stage in which the TS 100 completes locking on the UAV 200. Thus, the UAV 200 is reliably captured by the TS 100, and consumption of the battery of the UAV 200 is reduced.

Other Matters

A UAV that is flying must be monitored in some cases. In such cases, the UAV may not necessarily be located, but the UAV must be captured and be locked on by an optical device such as a TS in an initial stage as in the case of the above embodiment. The present invention may be used for a technique used in such cases.

FIGS. 4 and 5 show an example of locking on a UAV by a TS immediately after the UAV starts to fly. However, the present invention can also be used in a technique for relocking on a UAV by a TS when the TS loses sight of the UAV that is flying. In this case, the UAV may receive a lost signal that is transmitted from the TS, and then the UAV may hover and transmit its location information to the TS to enable the TS to relock on the UAV.

The processing shown in FIGS. 4 and 5 is a method for easily capturing the UAV 200 by the TS 100. In this processing, the UAV 200 is made to hover, and in the meantime, the TS 100 calculates the direction of the UAV 200 as seen from the TS 100 and captures the UAV 200. Instead of hovering, since the UAV 200 remaining in a specific airspace is easy to find, the UAV 200 may be made to fly in circles, fly back and forth, fly in a figure-8 course, or fly in another pattern, in the specific airspace. Under these conditions, the TS 100 may capture and lock on the UAV 200.

In this case, although the location information of the UAV 200 obtained by the TS 100 scatters in a specific range, the direction of the UAV 200 is approximately calculated by using an average value or a center value of the scattered information, and the UAV 200 is searched for by referring to this approximate direction.

The processing shown in FIGS. 4 and 5 may also be controlled by a personal computer (PC), a tablet, a piece of dedicated hardware, or other device. For example, in a case of using a PC, the PC is connected to the communicating unit and thus communicates with each of the TS and the UAV. Under control of the PC, the processing shown in FIG. 4 is executed at the UAV, and the processing shown in FIG. 5 is executed at the TS. Alternatively, multiple pieces of hardware may perform the processing in a distributed manner and may comprehensively operate as a system. For example, a system performing the processing shown in FIGS. 4 and 5 via communication may be configured by implementing a communication function and a user interface function by a smart phone and by implementing the other functions by a PC, a piece of dedicated hardware, a server, or other device.

What is claimed is:

1. An unmanned aerial vehicle tracking method for tracking an unmanned aerial vehicle by a total station, the unmanned aerial vehicle using a global navigation satellite system for location measurement, the method comprising:

obtaining information of a location of the total station as a reference location;

starting flight of the unmanned aerial vehicle to make the unmanned aerial vehicle climb to an altitude that is specified in a flight plan;

making the unmanned aerial vehicle hover at the specified altitude;

measuring a location of the unmanned aerial vehicle that is hovering;

obtaining information of the measured location of the unmanned aerial vehicle that is hovering, by the total station;

calculating a direction of the unmanned aerial vehicle as seen from the reference location on a basis of the reference location and the obtained information of the measured location of the unmanned aerial vehicle that is hovering; and capturing the unmanned aerial vehicle by the total station on a basis of the calculated direction of the unmanned aerial vehicle as seen from the reference location.

* * * * *